Oct. 22, 1963     S. MEURER     3,107,658
IGNITION DEVICE
Filed Oct. 12, 1962     2 Sheets-Sheet 1
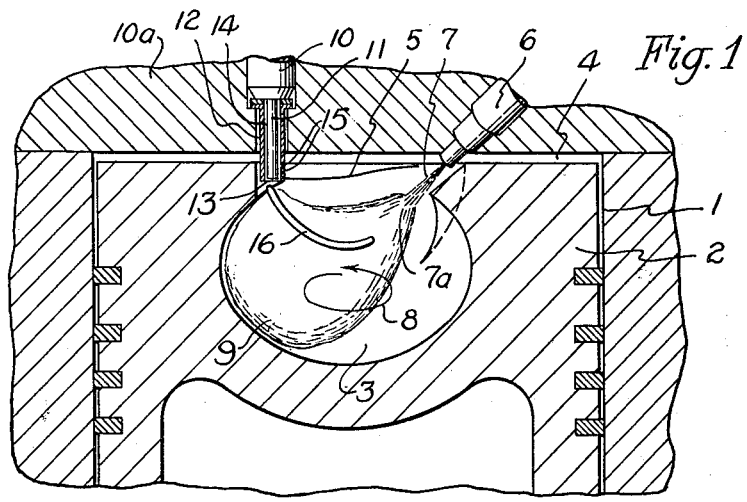
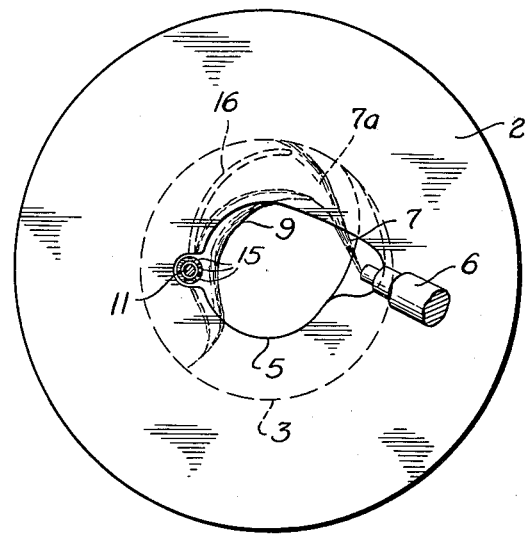
INVENTOR
*Siegfried Meurer*
BY *Bailey, Stephens & Huettig*
ATTORNEYS Oct. 22, 1963  S. MEURER  3,107,658
IGNITION DEVICE
Filed Oct. 12, 1962  2 Sheets-Sheet 2
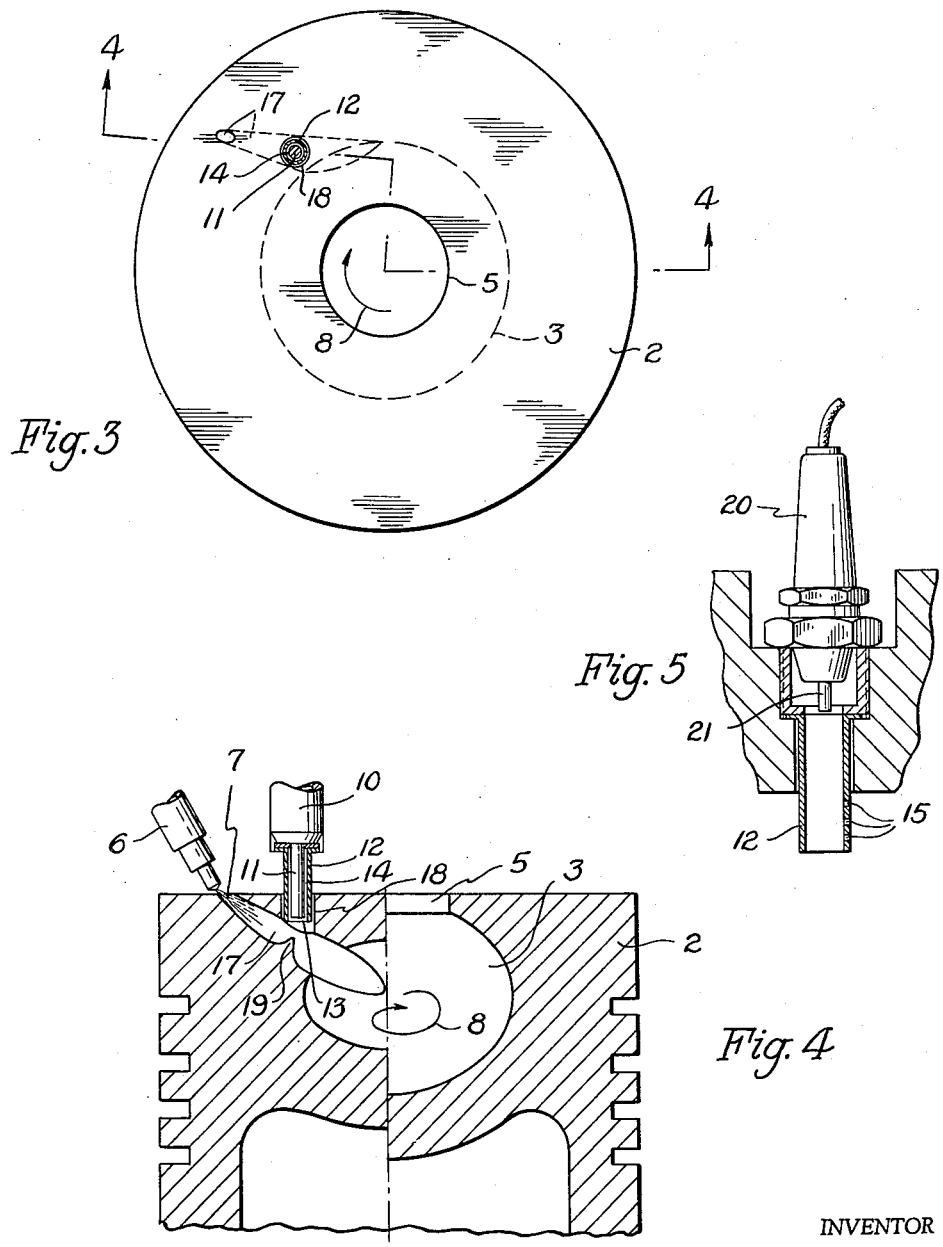

United States Patent Office 3,107,658
Patented Oct. 22, 1963

3,107,658
IGNITION DEVICE
Siegfried Meurer, Nurnberg, Germany, assignor to Maschinenfabrik Augsburg-Nurnberg A.G., Nurnberg, Germany
Filed Oct. 12, 1962, Ser. No. 230,805
Claims priority, application Germany Mar. 2, 1962
4 Claims. (Cl. 123—32)

This invention relates to the igniting of fuel in an internal combustion engine.

In particular, this invention is directed to a device for the igniting of fuel in an internal combustion engine having a combustion chamber in the piston or in the cylinder head. According to this invention, the major portion of the fuel is injected into the combustion chamber in the form of one or more jets directed toward the wall of the combustion chamber so that the fuel is spread over the wall in the form of a thin film. At the same time, the intake air is swirled around the axis of the combustion chamber so as to be mixed with the fuel gradually evaporated from the film and the mixture then burned.

The igniting device can be, for example, a spark plug or an electrical heat resistor having a hot point extended into the combustion chamber or which can be a hot bulb or any other well-known igniting device.

One of the requirements for this mixing of the intake air with the vaporized fuel is the creation of the special air swirl within the combustion chamber. However, this strong air swirl flowing across the igniting element, such as a spark plug or hot bulb, cools to such a degree that, after the fuel has been injected into the combustion chamber, the temperature of the igniting element is not high enough to ensure ignition of the air-fuel mixture.

The object of this invention is to eliminate this disadvantage. A further object of this invention is to produce the effectiveness of the igniting element for igniting the air-fuel mixture in the type of combustion used, that is the forming of a film of fuel on the wall of the combustion chamber along with the formation at all times and under all engine load conditions a ratio of fuel to air mixture that is readily ignitable by the igniting element.

According to this invention, the igniting element has at least a portion of the area directed toward the combustion chamber surrounded by a spaced open enclosure. The actual ignition source in this way is sheltered from and out of reach of the immediate swirl of the intake combustion air so that the required ignition temperature remains the same under all operating conditions of the engine, and this is true even when very cold intake air is used. This also has the very essential advantage that fuels difficult to ignite can be used. Consequently, an engine provided with this igniting element can be operated by a variety of fuels.

In the type of combustion contemplated by this invention, self-ignition of the fuel in the combustion engine is obtained from the particles of fuel separated from the injected fuel before the fuel is spread onto the wall of the combustion chamber, which particles mix with the compressed air. Hence if the igniting element of this invention is used to assist in the ignition of a fuel having a high boiling point or during cold starting, then there occurs the requirement that an air-fuel mixture capable of ignition is formed adjacent the igniting element at just the right time. The particles of fuel which had been separated from the injected fuel jet are not suitable for this since they cannot form an air-fuel mixture capable of being ignited by the igniting element because they constitute such a small part of the entire quantity of fuel and also because they are carried past the igniting element too quickly by the strong air swirl. Thus the enclosure around the igniting element area has the advantage of retaining or holding back those particles of fuel that have entered the enclosure in the vicinity of the igniting element. In most cases, it is nevertheless necessary to increase the ignition effect. This described method of combustion with the use of auxiliary ignition in an Otto engine is very suitable despite the fact that a throttling of the intake air takes place, such as in diesel engine combustion with quality control, since an ignitable mixture is automatically formed by the air swirl at the periphery of the combustion engine and is independent of the volume of fuel that has been injected into the combustion chamber, since the specifically heavier fuel particles are thrown outwardly by the air swirl and centrifugal force. Thus it is only necessary to mount the igniting element sufficiently deeply in the combustion chamber so that it reaches to the equator of the chamber when the piston is at upper dead center. Although this is quite successful insofar as ignition is concerned, it nevertheless has the disadvantage of obstructing the air swirl which, in turn, impairs the formation of the air-fuel mixture and causes a smoky exhaust.

In order to avoid such a deep extension of the igniting element into the combustion chamber, a further feature of this invention lies in providing one or more guide channels in the wall of the combustion chamber and in front of the opening of the enclosure surrounding the igniting element. These channels remove fuel from the interior of the combustion chamber and are formed, for example, in a curve so that the removed fuel particles are immediately diverted toward the igniting element. Thus the igniting element and the enclosure forming a space therearound can be withdrawn to the cylinder head rather than extending to the equator of the combustion chamber, as in the case of a spark plug. The particles are directed by the channels by means of the kinetic energy coming from the fuel jet and partially under the centrifugal force provided by the air swirl. The so diverted particles of fuel partially mix with the air present in the space enclosed around the igniting element, which air is highly heated by the igniting element, and partially directly ignited by impact with the igniting element. An igniting flame then shoots out of the opening of the enclosure into the combustion chamber, which flame penetrates the mixed with the fuel vaporized from the fuel film and thus ensures ignition of the mixture.

An improved form of this ignition means has greater effectiveness by forming two or more partial flames directed into a definite zone within the combustion chamber as, for example, into a zone where the fuel-air mixture most favorable for the starting of combustion has been formed. Such zone can be determined in each case by examination of the existing condition of the air swirl and formation of air-fuel mixture with respect to the particular form of combustion chamber. A further feature of this invention lies in that the enclosure surrounding the igniting element is provided at its outer end with one or more openings communicating with the combustion chamber, which openings are at least approximately at right angles to the direction of the air swirl. A portion of the air-fuel mixture which has been ignited in the space between the enclosure and the igniting element can then penetrate into a given zone or zones of the combustion chamber in the form of one or more small ignition flames or sparks so that the entire air-fuel mixture which has been formed in various portions of the chamber by the evaporation of the fuel film is then ignited by many sparks. As the axis of the main opening of the enclosure is parallel to the longitudinal axis of the combustion chamber and since the axis or axes of the small additional bores through the wall of the enclosure extend perpendicular to the longitudinal axis of the combustion chamber, there exists at the small openings on the side of the enclosure a static lower pressure as compared to the main opening because of the flow of air around the enclosure, and this lower pressure facilities the entrance of fuel through the main opening. The small additional bores in the enclosure can be positioned to fit any special needs and arranged in special groups or series.

Under conditions other than for this invention, fuel has been injected into the combustion chamber through one or more passageways extending through the piston head. This feature is also used for this invention by providing an additional opening extending from the surface of the piston head down into the passageway and into which the igniting element can enter just before the beginning of fuel injection and as the piston approaches upper dead center. A deflecting means such as a vane or rib in the passageway beneath the igniting element deflects a portion of the fuel in such a way that a measurable quantity of fuel particles is directed toward the igniting element and into the space between the igniting element and the enclosure therefor. In this space and in the remainder of the passageway, enough air is received from the compression stroke so that the deflected air-fuel mixture can be ignited. The thus formed burning gases enter the combustion chamber in the piston head and ignite the air-fuel mixture therein.

The means by which the objects of the invention are obtained are described more fully with reference to the accompanying drawings, in which:

FIGURE 1 is a cross-sectional view through a portion of a piston in a cylinder and covered by a cylinder head;

FIGURE 2 is a top plan view of the piston head shown in FIGURE 1;

FIGURE 3 is a view similar to FIGURE 2 of a modified form of the invention;

FIGURE 4 is a cross-sectional view taken on the line 4—4 of FIGURE 3; and

FIGURE 5 is a cross-sectional view of a spark plug used as the igniting element.

In FIGURES 1 and 2, the cylinder 1 contains a reciprocating piston 2 shown at upper dead center. Piston 2 has a combustion chamber 3 shown, for example, in the form of a circular ellipsoid. Cylinder space 4 communicates with combustion chamber 3 through a neck opening 5. The liquid fuel is injected from fuel nozzle 6 in the form of a solid jet 7 in the same direction of the air swirl indicated by arrow 8 which flows about the axis of the cylinder. Jet 7 strikes the wall of the combustion chamber and is spread at a wide angle of impact over a large area of the wall to form a film 9. The igniting element 10 is mounted in the cylinder head 10a approximately diametrically opposed to injection nozzle 6 or in any other desired position. The igniting element shown is an electrically heated glow bulb 11 which projects partly into the cylinder space 4 while the remaining portion is mounted in the cylinder head. This glow bulb is surrounded by an enclosure composed of a cylindrical jacket or casing 12 fastened to the head of the igniting element and which projects slightly beyond the free end of bulb 11 to form a main opening 13. Jacket 12 is spaced from bulb 11 by a distance 14 which is made more or less large to meet any given requirement. Additional small openings 5 extend through the lower end of jacket 12, which small bores have axes extending perpendicular to the longitudinal axis of combustion chamber 3. A curved, guide channel or passageway means 16 in the wall of the combustion chamber extends from immediately below main opening 13 of jacket 12 to a point approximately in the plane of the equator of the combustion chamber which is within the area of the fuel film 9. Fuel jet 7 strikes the wall at 7a to begin the fuel film 9 and a portion of the surface area of the film extends over channel 16, aside from a few particles of fuel which have split away from the fuel jet 7. The fuel, including the particles, is guided by channel 16 into space 14 as well as upon the surface of bulb 11 by reason of the kinetic energy of the fuel injection and also by the air swirl. The amount of fuel thus directed into sheltered space 14 is controlled by the width, length, and/or position of channel 16. The fuel, including any split-off particles which enter space 14 either through main opening 13 or the small openings 15, are mixed with the air in space 14. The mixture is ignited by the heat of bulb 11 and a flame or spark is formed which shoots out through main opening 13 into combustion chamber 3 to ignite the air and vaporized fuel mixture therein. In addition, flames or sparks enter combustion chamber 3 from the small openings 15 to intensify the ignition of the air-fuel mixture, particularly in those zones where the mixture has been formed during the ignition time.

The position and/or direction of injection nozzle 6 and its jet 7 with respect to the position of the igniting element 10 and the fuel channel is such that the fuel impact point 7a lies at or in advance of the beginning of channel 16.

In the modification of FIGURES 3 and 4, similar parts bear the same reference characters as in FIGURES 1 and 2. In this modification, a passageway means or bore 17 in the piston head extends from the surface of the piston into combustion chamber 3 where it terminates at a wide angle in the wall of the chamber. This passageway expands conically as does the injected fuel jet 7 toward combustion chamber 3. Approximately midway of passageway 17 there is an opening 18 extending from the passageway to the surface of the piston head. The lower end of igniting element 10 extends into opening 18 as the piston head approaches upper dead center. The diameter of jacket 12 and the diameter of opening 18 are made as close together as is possible. Beneath igniting element 10, a deflecting member 19 is placed in passageway 17 which, as shown, is in the form of a rib or vane lying in the path of fuel jet 7. The form and position of member 19 is such that a small or large given amount of fuel can be deflected from the fuel jet 7 into space 14. Some of the fuel particles entering space 14 directly hit bulb 11. The intensely heated air in space 14, by reason of bulb 11, volatilizes the fuel particles which become ignited and shoot a flame into chamber 3 partially with fuel jet 7 and partially behind jet 7 ignite the mixture of air and fuel formed from the fuel film on the wall of chamber 3.

Deflecting member 19 can be in the form of a trough, which is preferably somewhat curved so that the deflected fuel particles do not pass through fuel jet 7 but are led around the periphery of the fuel jet and flow toward the igniting element.

As shown in FIGURE 5, the igniting element is composed of a spart plug 20 having an electrode 21. The jacket 12 for forming a sheltered area adjacent electrode 21 is fastened to the bottom edge of the threaded wall of the spark plug. As shown, small openings 15 extend through the jacket 12 in addition to the main opening at the bottom of the jacket.

Having now described the means by which the objects of the invention are obtained, I claim:

1. An ignition device for a fuel injection combustion engine having a combustion space, means for injecting fuel onto the wall of the combustion space to form a film of fuel, and means for forming a unidirectional air swirl in said combustion space for mixing air with fuel vaporized from said film, comprising a fuel igniting element communicating with said combustion space, cylindrical air baffle means surrounding at least a portion of the area adjacent said element and opened toward said combustion space for forming a relatively quiet air space adjacent said element adapted to receive fuel particles sheltered from said air swirl, said baffle means being directed toward the portion of said combustion space containing a mixture of vaporized fuel and air most favorable for combustion, and passageway means in at least a portion of the wall of the combustion space and communicating with said fuel injecting means for directing particles of fuel toward said igniting element and into said quiet air space.

2. An ignition device as in claim 1, said passageway means extending from about the middle of the wall of said combustion space at approximately the point where the injected fuel jet strikes said wall to begin the forming of said fuel film.

3. An ignition device as in claim 1, further comprising bore means in said baffle means for providing openings for the passage of incandescent fuel from said igniting element toward said combustion space and opposite to the direction of said air swirl.

4. An ignition device as in claim 1, said combustion space being in a piston head having said passageway means through which the fuel is injected, and further comprising an opening from the surface of said piston head into said passageway means and adapted to receive said igniting element as the piston approaches upper dead center, and vane means in said passage beneath said opening for directing fuel particles injected into said passage toward said igniting element.

References Cited in the file of this patent

UNITED STATES PATENTS

| | | |
|---|---|---|
| 2,061,826 | Bremser | Nov. 24, 1936 |
| 2,120,768 | Ricardo | June 14, 1938 |
| 2,995,121 | Meurer | Aug. 8, 1961 |
| 3,063,434 | Haas | Nov. 13, 1962 |

FOREIGN PATENTS

| | | |
|---|---|---|
| 54,151 | France | Dec. 17, 1947 |
| 1,051,186 | France | Sept. 9, 1953 |